US009203977B2

(12) United States Patent
Dun

(10) Patent No.: US 9,203,977 B2
(45) Date of Patent: Dec. 1, 2015

(54) METHOD, APPARATUS AND SYSTEM FOR SERVICE ASSOCIATION BASED ON SERVICE NESTING CHARGING

(71) Applicant: Huawei Technologies Co., Ltd., Shenzhen, Guangdong (CN)

(72) Inventor: Taiyong Dun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 382 days.

(21) Appl. No.: 13/714,282

(22) Filed: Dec. 13, 2012

(65) Prior Publication Data
US 2013/0101103 A1   Apr. 25, 2013

Related U.S. Application Data

(63) Continuation of application No. PCT/CN2011/072905, filed on Apr. 18, 2011.

(30) Foreign Application Priority Data

Jun. 13, 2010 (CN) .......................... 2010 1 0204847

(51) Int. Cl.
*H04M 15/00* (2006.01)
*H04L 12/14* (2006.01)

(52) U.S. Cl.
CPC ............... *H04M 15/82* (2013.01); *H04L 12/14* (2013.01); *H04L 12/1425* (2013.01); *H04L 12/1428* (2013.01); *H04M 15/00* (2013.01); *H04M 15/41* (2013.01); *H04M 15/62* (2013.01)

(58) Field of Classification Search
CPC ....................................................... H04M 15/00
USPC ............. 379/114.01, 114.03, 114.04, 114.05, 379/114.06, 114.1, 114.26
See application file for complete search history.

(56) References Cited

U.S. PATENT DOCUMENTS

| 8,116,728 B2* | 2/2012 | Cai et al. ................... 455/406 |
| 2003/0112934 A1 | 6/2003 | Draizin et al. |

(Continued)

FOREIGN PATENT DOCUMENTS

| CN | 1905462 A | 1/2007 |
| CN | 101047515 A | 10/2007 |

(Continued)

OTHER PUBLICATIONS

1st Office Action in corresponding Chinese Patent Application No. 201010204847.3 (Nov. 27, 2012).

(Continued)

*Primary Examiner* — Yosef K Laekemariam
(74) *Attorney, Agent, or Firm* — Leydig, Voit & Mayer, Ltd.

(57) ABSTRACT

The present invention discloses a method, an apparatus and a system for service association based on service nesting charging. Wherein the method for service association based on the service nesting charging includes: obtaining a request message sent from a service platform, wherein the request message carries key service information; searching in stored service record information for the service record information which matches the key service information, wherein if matched service record information exists, then a charging identifier in the matched service record information is obtained, and if no matched service record information exists, then a charging identifier is allocated, said charging identifier being used for performing an association charging on multiple services which have the same charging identifier by a charging platform; sending the charging identifier and the information carried in the request message to a receiving end of the request message.

15 Claims, 5 Drawing Sheets

(56) References Cited

U.S. PATENT DOCUMENTS

2009/0089208 A1 4/2009 Wu et al.
2012/0008523 A1* 1/2012 Zhou et al. .................... 370/252

FOREIGN PATENT DOCUMENTS

| CN | 101489206 A | 7/2009 |
| CN | 101540807 A | 9/2009 |
| CN | 101582778 A | 11/2009 |
| CN | 101645781 A | 2/2010 |

OTHER PUBLICATIONS

Written Opinion of the International Searching Authority in corresponding PCT Patent Application No. PCT/CN2011/072905 (Jul. 28, 2011).
International Search Report in corresponding PCT Patent Application No. PCT/CN2011/072905 (Jul. 28, 2011).
$2^{nd}$ Office Action in corresponding Chinese Patent Application No. 201010204847.3 (Jun. 28, 2013).

* cited by examiner

METHOD, APPARATUS AND SYSTEM FOR SERVICE ASSOCIATION BASED ON SERVICE NESTING CHARGING

CROSS-REFERENCE TO RELATED APPLICATION

This application is a continuation of International Patent Application No. PCT/CN2011/072905, filed on Apr. 18, 2011, which claims priority to Chinese Patent Application No. 201010204847.3, filed on Jun. 13, 2010, both of which are hereby incorporated by reference in their entireties.

FIELD OF THE INVENTION

The present invention relates to a technical field of network communication, and particularly, to a technology of service nesting charging.

BACKGROUND OF THE INVENTION

Currently, integrated telecom operators provide increasingly rich varieties of services to subscribers. The integrated telecom operators allow the subscribers to simultaneously subscribe to several services such as service of multiple terminals with one number and Virtual Private Network (VPN) service. The service of multiple terminals with one number means that multiple communication terminals are externally reflected as one number, and the subscribers can flexibly make a call using the multiple communication terminals. The VPN service means that the subscribers can dial a short group number to realize a group call.

In case that a subscriber simultaneously subscribes to multiple services, those services will be nested, i.e., one communication made by the subscriber using a communication terminal may simultaneously trigger the multiple services. For example, communication terminals 1 and 2 subscribe to the service of multiple terminals with one number and are externally reflected as the number of communication terminal 1, and communication terminal 2 subscribes to the VPN service. When the subscriber dials a short group number using communication terminal 2, the service of multiple terminals with one number is triggered firstly, and then the VPN service is triggered. The service of multiple terminals with one number modifies the calling number as the number of communication terminal 1, and the VPN service translates the called short group number into a long group number for a call connection.

During the implementation of the present invention, the inventor finds that different services are corresponding to different service platforms, and the service platforms cannot be aware that the services are nested, thus each of the service platforms initiates a independent charging request flow during the implementation of the service respectively. Since a charging platform cannot be aware that the services are nested, it executes independent charging flows for each of the charging request flows respectively. As a result, when one communication made by the subscriber triggers multiple services, the charging platform will charge the triggered services, respectively, so that the charging result for the one communication is a sum of the charged fees for the multiple services. Thus the charging mode in the prior art is inflexible, and cannot meet various charging requirements for the nested services.

SUMMARY OF THE INVENTION

A method, apparatus and system for associating services based on service nesting charging according to embodiments of the present invention can associate nested services with each other, thus improving flexibility of a charging mode for the nested services.

An embodiment of the present invention provides a method for associating services based on service nesting charging, including:
  obtaining from a service platform a request message carrying key service information;
  performing a Charging Identifier processing according to the request message to obtain a charging identifier, including: searching in stored service record information for a piece of service record information which matches the key service information; and
  obtaining, if a piece of matched service record information exists, a charging identifier in the matched service record information, and allocating a charging identifier if no matched service record information exists, wherein the charging identifier is used by a charging platform to perform an association charging on a plurality of services having the same charging identifier; and
  sending the charging identifier and information carried in the request message to a receiving end of the request message.

An embodiment of the present invention provides an apparatus for associating services based on service nesting charging, including:
  an obtaining module configured to obtain from a service platform a request message carrying key service information;
  a Charging Identifier processing module configured to search in stored service record information for a piece of service record information which matches the key service information, obtain, if a piece of matched service record information exists, a charging identifier in the matched service record information, and allocate a charging identifier if no matched service record information exists, wherein the charging identifier is used by a charging platform to perform an association charging on a plurality of services having the same charging identifier; and
  a first sending module configured to send the charging identifier and information carried in the request message to a receiving end of the request message.

An embodiment of the present invention provides a system for associating services based on service nesting charging, including a service association engine connected to a service platform;
  wherein the service platform is configured to send a request message carrying key service information; and
  wherein the service association engine is configured to obtain the request message sent by the service platform, search in stored service record information for a piece of service record information which matches the key service information, obtain, if a piece of matched service record information exists, a charging identifier in the matched service record information, or allocate a charging identifier if no matched service record information exists, and send the charging identifier and information carried in the request message to a receiving end of the request message, wherein the charging identifier is used by a charging platform to perform an association charging on a plurality of services having the same charging identifier.

As can be seen from the descriptions of the above technical solutions, the present invention matches the key service information carried in the request message with the stored service record information to obtain, if a piece of matched service record information exists, a charging identifier from the matched service record information, or allocate a charging identifier if no matched service record information exists, so that the services nested with each other have the same charging identifier. As a result, the charging platform may determine multiple associated services nested with each other according to the charging identifier. Thus, the charging platform can flexibly charge the associated services according to a rate corresponding to the service configuration rule, and thus improve flexibility of a charging mode for the nested services.

BRIEF DESCRIPTION OF THE DRAWINGS

In order to more clearly describe the technical solutions of the embodiments of the present invention or the prior art, the drawings to be used in the descriptions of the embodiments or the prior art are briefly introduced as follows. It will be appreciated that the following drawings just illustrate some embodiments of the present invention, and a person skilled in the art can obtain other drawings from these drawings without paying a creative effort.

DETAILED DESCRIPTION OF THE PREFERRED EMBODIMENTS

The specific implementations of the present invention are illustrated hereinafter by means of embodiments. It will be appreciated that the described embodiments are just a part of the embodiments of the present invention rather than all the embodiments. A person skilled in the art can obtain any other embodiment, which falls within the scope of the present invention, based on the embodiments of the present invention without paying a creative effort.

Figure 1:
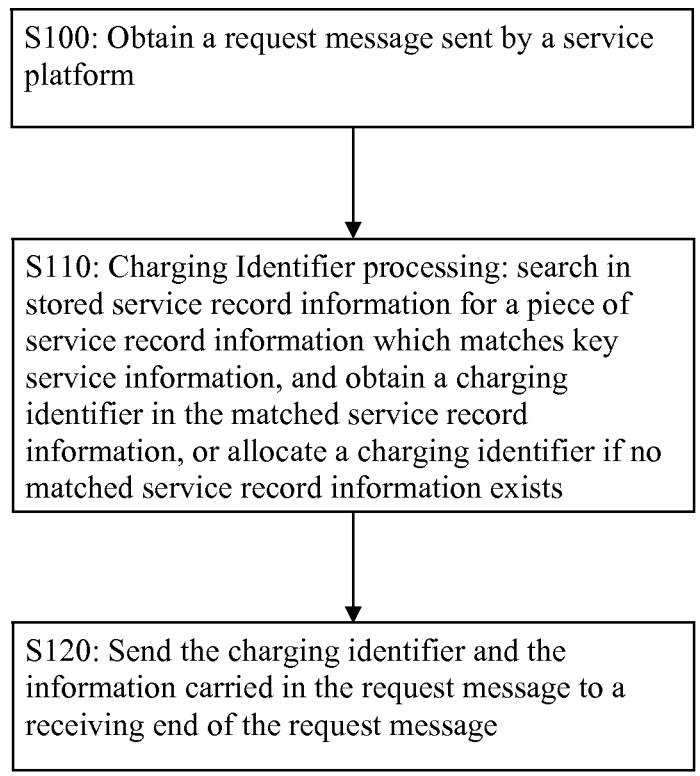
FIG. 1 is a flowchart of a method for associating services based on service nesting charging according to Embodiment 1 of the present invention.

Embodiment 1 is a method for associating services based on service nesting charging. The flowchart of the method is described with reference to FIG. 1.

In step S100, a request message carrying key service information is obtained from a service platform.

Since charging request message carries key service information in the prior art, this embodiment may takes charging request message in the prior art as the request message. Of course, the request message may be other message than the charging request message, such as a message newly added for this embodiment for carrying the key service information.

Although various embodiments herein are mainly described through the examples where the charging request message is taken as the request message, the request message undoubtedly may be a message in other form, and the specific form of the request message is not limited in this embodiment.

In case of an online charging service, a service platform in the prior art needs to send a charging request message to the charging platform during the implementation of the service. The executor of step S100 may intercept the charging request message sent from the service platform to the charging platform, i.e., the charging request message sent from the service platform with respect to the online charging service is transferred to the charging platform through the executor of step S100. Herein the online charging service may be an online charging session service such as a call service or a network traffic service, or an online charging event service such as a short message service or a multimedia message service. The online charging service also may be classified into a prepaid online charging service and a real-time credit-control postpaid online charging service. That is, in case of the online charging service, the charging request message obtained by the executor of step S100 may be a charging request message of the prepaid online charging service or of the real-time credit-control postpaid online charging service.

In case of the online charging session service, the charging request message sent from the service platform to the charging platform may include a charging start request message and a charging termination request message. Alternatively, the charging request message may further include a charging intermediate request message.

In case of the online charging event service, the charging request message sent from the service platform to the charging platform may include a charging event request message.

In case of an offline charging service, a service platform in the prior art does not need to send any charging request message to the charging platform during the implementation of the service, and only generates a phone bill at the end of the service. This embodiment shall reform the service platform, so that it sends a charging request message to the executor of step S100. The offline charging service is typically a non-real-time credit-control postpaid offline charging service. That is, in case of the offline charging service, the charging request message obtained by the executor of step S100 is typically a charging request message of the postpaid offline charging service. With respect to the offline charging service, it shall be especially pointed out that the executor of step S100 may not transfer the charging request message, which is sent from the service platform, to the charging platform, and the charging request message is mainly used by the service platform to request for a charging identifier corresponding to the service.

The charging request message used in step S100 specifically may be a Credit Control Request (CCR) message, or a charging request message based on other protocols such as an operator's private protocol. This embodiment does not limit the protocol employed by the charging request message, or the type of the service that triggers the service platform to send the charging request message. In addition, the executor of step S100 can identify the online charging service and the offline charging service according to the information carried in the charging request message. For example, a field of the prior art charging request message can be extended so that the executor of step S100 can identify the online charging service and the offline charging service according to the information carried in the field. This embodiment does not limit the implementation of identifying the online charging service and the offline charging service.

In step S110, Charging identifier processing is performed. The charging identifier processing includes: searching in stored service record information for a piece of service record information which matches the key service information carried in the request message; and if a piece of matched service record information exists, obtaining a charging identifier in the matched service record information, and if no matched service record information exists, allocating a charging identifier.

In case of the online charging service, if the received charging request message is an initial charging request message for the service, such as a charging start request message (for example, a CCR message carrying the Initial information), a fuzzy matching may be performed with the stored service record information according to service attribute information carried in the initial charging request message. If a piece of fuzzily matched service record information exists, then a charging identifier in the matched service record information is obtained, and if no fuzzily matched service record information exists, then a charging identifier is allocated. The executor of step S110 shall ensure that the charging identifier allocated to the present online charging service is globally unique for a predetermined period (such as seven days). The service attribute information is used for describing the service, and the content thereof may be set according to the type of the service that triggers the charging request message. For example, when the charging request message is triggered by a call service (e.g., a prepaid call service or a postpaid call service), the service attribute information carried in the charging start request message may include a terminal number of a currently charging subscriber, a calling number, a called number and call start time, etc.

In case that the service attribute information includes a terminal number of a currently charging subscriber, a calling number, a called number and call start time, an example of the fuzzy matching is specifically described as follows. If the terminal number of the currently charging subscriber, the calling number and the called number carried in the charging request message are the same as those in the stored service record information, and there is a predetermined time interval (e.g., 1 s) between the call start time in the charging request message and that in the stored service record information, it is determined that a piece of fuzzily matched service record information exists.

In case of the online charging service, if the received charging request message is not an initial charging request message for the service, for example, it is a charging intermediate request message, or a charging termination request message such as a CCR message carrying Termination information, a charging identifier may be obtained by searching in the stored service record information according to service identification information carried in the received charging request message. The service identification information is used for uniquely identifying a service initiated by the subscriber, and the content thereof may be set according to the type of the service that triggers the charging request message. For example, when the charging request message is triggered by a call service (e.g., a prepaid call service or a postpaid call service), the service identification information carried in the charging intermediate request message or the charging termination request message may be a session identifier. The form of the service identification is not limited in this embodiment.

In case of the offline charging service, if a charging request message such as a charging start request message is received, a fuzzy matching may be performed with the stored service record information according to the service attribute information carried in the charging request message. If a piece of fuzzily matched service record information exists, then a charging identifier in the fuzzily matched service record information is obtained, and if no fuzzily matched service record information exists, then a charging identifier is allocated. Similarly, the executor of step S110 shall ensure that the charging identifier allocated to the present offline charging service is globally unique for a predetermined period. In addition, the content of the service attribute information carried in the charging request message for the offline charging service also may be set according to the type of the service that triggers the charging request message.

The content of the stored service record information in this embodiment is related to the service attribute information and/or service identification information. For example, the stored service record information may include a terminal number of a currently charging subscriber, a calling number, a called number, call start time, service identification information and a charging identifier, etc. It will be appreciated that, in case of the offline charging call service, the stored service record information may not include the service identification information, and in case of an event service (e.g., a prepaid event service or a postpaid event service), the stored service record information may not include the service identification information, and the call start time shall be occurrence time of the specific service. This embodiment does not limit the contents of the service attribute information, the service identification information and the service record information.

In case of the online charging service, the process of storing the service record information includes: upon receiving an initial charging request message (e.g., a charging start request message) for the service sent from the service platform to the charging platform and allocating a charging identifier, sending, by the executor of step S110, to the charging platform the charging start request message that carries the charging identifier; processing, by the charging platform, the received charging start request message, and returning a charging answer message (e.g., a credit control answer message) carrying the charging identifier to the service platform; and intercepting, by the executor of step S110, the charging answer message sent by the charging platform, and storing, by the executor of step S110, the charging identifier and the service attribute information carried in the charging start request message into the service record information, when the charging answer message indicates that the charging succeeds. To be noted, upon receiving the charging answer message returned by the charging platform in response to the charging request message, the executor of step S110 may remove the charging identifier from the charging answer message, and send the charging answer message with the charging identifier removed to the service platform to avoid reforming the service platform. In addition, upon receiving the initial charging request message for the service sent by the service platform and obtaining the charging identifier from the service record information, the executor of step S110 may also store the charging identifier and the service attribute information carried in the charging start request message into the service record information, upon receiving the charging answer message indicating that the charging succeeds returned by the charging platform in response to the charging request message.

In case of the offline charging service, the process of storing the service record information includes: upon receiving a charging request message (e.g., a charging start request message) for the service sent from the service platform and allocating a charging identifier, storing, by the executor of step S110, the allocated charging identifier and the service attribute information carried in the charging request message into the service record information. To be noted, with respect to one offline charging service, the service platform may send the charging request message just once.

In step S120, the charging identifier and the information carried in the request message is sent to a receiving end of the request message. Herein, the charging identifier is used by the charging platform to perform an association charging on the multiple services which have the same charging identifier.

In case of the online charging service, the receiving end of the request message is the charging platform. For example, the executor of step S120 sends to the charging platform a charging request message that carries the charging identifier.

In case of the offline charging service, the receiving end of the request message is the service platform. For example, the executor of step S120 directly sends to the service platform a charging answer message that carries the charging identifier.

With respect to Embodiment 1, it shall be noted that the executor thereof may be provided within the charging platform, i.e., arranged integrally with the charging platform, or provided separately from the charging platform, i.e., arranged between the service platform and the charging platform.

Embodiment 1 matches the key service information carried in the request message with the stored service record information to obtain the charging identifier from the matched service record information, or allocates a charging identifier when no matched service record information exists, so that the services nested with each other have the same charging identifier. As a result, the charging platform may determine the multiple associated services nested with each other according to the charging identifier. Thus, the charging platform can flexibly charge the associated services according to a rate corresponding to the service configuration rule, and thus improve flexibility of a charging mode for the nested services.

Embodiment 2 is a method for performing an association charging on services based on service nesting. An executor of this embodiment may be a charging platform, which may be an online charging platform or an offline charging platform. The flowchart of the method is illustrated in FIG. 2.

Figure 2:
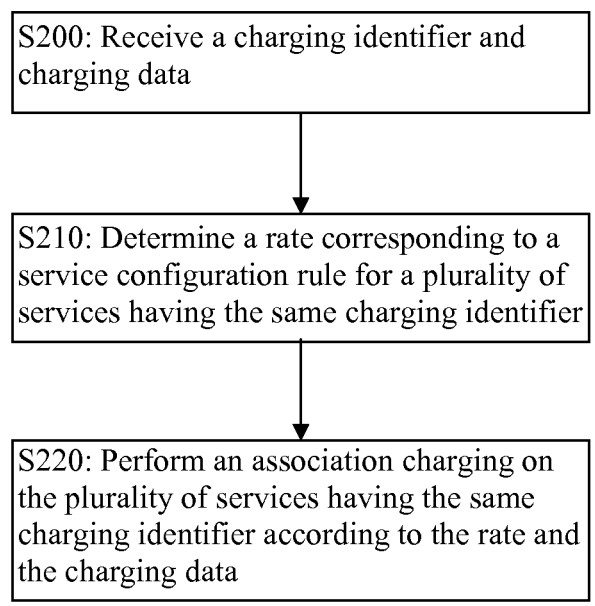
FIG. 2 is a flowchart of a method for associating services based on service nesting charging according to Embodiment 2 of the present invention.

With reference to FIG. 2, in step S200, a message sent from a service association apparatus is received, and a charging identifier and charging data for a service carried in the message is stored into a charging storage unit.

In case of the online charging platform, the received message including the charging identifier and the charging data may be sent by the executor of Embodiment 1, and the charging identifier and the charging data may be carried in the charging request message, i.e., the online charging platform obtains the charging identifier and the charging data from the received charging request message.

In case of the offline charging platform, the received message including the charging identifier and the charging data may be sent by the service platform, and the charging identifier and the charging data may be carried in a phone bill, i.e., the offline charging platform obtains the charging identifier and the charging data from the received phone bill.

In step S210, a service configuration rule for a plurality of services having the same charging identifier in the charging storage unit is determined.

In case that a plurality of services have the same charging identifier, it means that they are services associated with each other due to service nesting. The charging platform may select and determine a service configuration rule for the plurality of services having the same charging identifier according to pre-stored service configuration rule. The service configuration rule for example may be association of a VPN service with a service of multiple terminals with one number. The content of the pre-stored service configuration rule is not limited in the present embodiment.

In step S220, an association charging on the plurality of services having the same charging identifier is performed according to a rate corresponding to the service configuration rule and the charging data, such as charging the VPN service according to a preferential rate for the VPN service, and charging the service of multiple terminals with one number according to a preferential rate for the service of multiple terminals with one number, etc. The charging platform may determine a rate corresponding to the service configuration rule for the plurality of services having the same charging identifier according to the correspondence between the pre-stored service configuration rule and respective rates. This embodiment does not limit the content of the correspondence between the pre-stored service configuration rule and respective rates, or the implementation process in which the charging platform performs an association charging according to the rate.

Since the rate corresponding to the service configuration rule is set for the associated services, the charging platform may charge the associated services in a flexible charging mode, thereby improving flexibility of a charging mode for the nested services.

In Embodiment 2, the charging platform may receive a charging identifier, and the services nested with each other have the same charging identifier. Thus, the charging platform may determine a plurality of associated services nested with each other according to the charging identifier, so as to flexibly charge the associated services according to the rate corresponding to the service configuration rule, and thus improve flexibility of a charging mode for the nested services.

Embodiment 3 is a method for associating services based on service nesting with respect to a prepaid online charging service. This embodiment is described hereinafter with reference to FIGS. 3A, 3B and 3C.

Figure 3A:
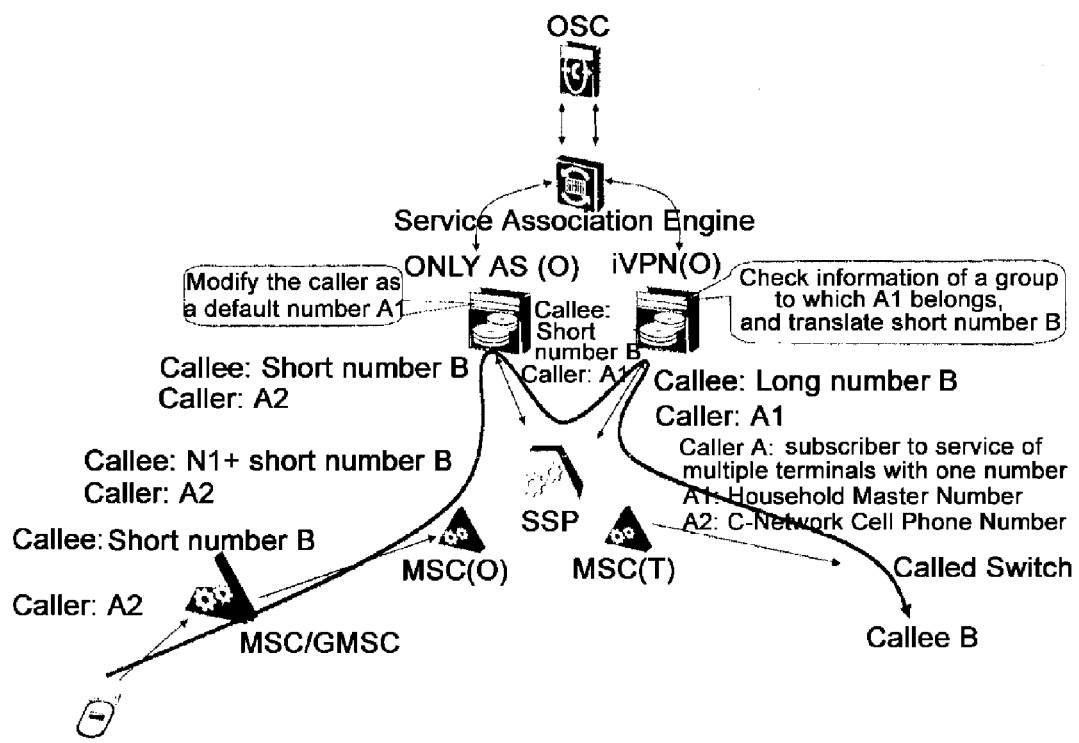
FIG. 3A is a schematic diagram of a network environment suitable for Embodiment 3 of the present invention.

In FIG. 3A, a Mobile Switching Centre/Gateway Mobile Switching Center (MSC/GMSC), a Mobile Switching Centre at Origination End (MSC (O)) and a Mobile Switching Centre at Termination End (MSC (T)) are core network switching devices, a Service Switch Point (SSP) is an intelligent service triggering device, a One Number Links You (ONLY) Application Server at Origination End (AS (O)) is a service of multiple terminals with one number platform, an Integrated Virtual Private Network at Origination End) (iVPN (O)) is a VPN service platform, and an Online Charging System (OCS) is a charging platform.

In this embodiment, a service association engine (i.e., an apparatus for associating services based on service nesting as shown in Embodiment 4) is located between the service platform and the OCS. The service association engine shall ensure that a charging identifier (CID) allocated to a service is globally unique for a predetermined period. The service association engine shall be capable of identifying nesting-based associated services according to information carried in the received request message, and ensure that the nesting-based associated services have the same CID.

Assuming that a prepaid subscriber simultaneously subscribes to a service of multiple terminals with one number and a VPN service. The service of multiple terminals with one number means that multiple communication terminals are externally reflected as one number, and the subscriber can flexibly make a call using the multiple communication terminals. The VPN service means that the subscriber can dial a short group number to realize a group call.

Figure 3B:
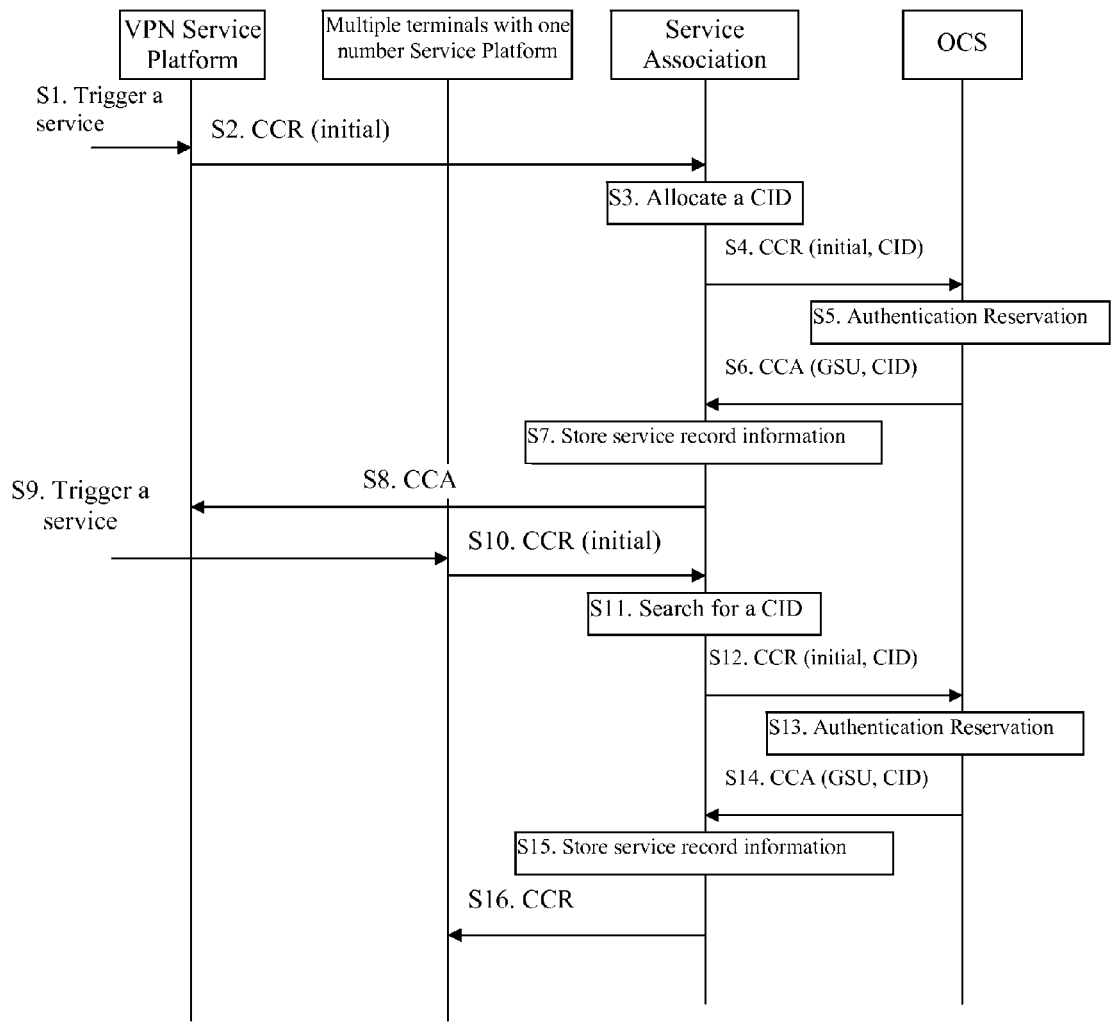
FIG. 3B is a flowchart of a method for associating services during a service triggering process according to Embodiment 3 of the present invention.

FIG. 3B illustrates a flow of a method for associating services, in which the subscriber initiates a call, and message exchanges are performed among the service association engine and the service of multiple terminals with one number platform, the VPN service platform and the OCS to realize the service of multiple terminals with one number (i.e., ONLY) and the VPN service.

With reference to FIG. 3B, in S1, the subscriber initiates a call, and the SSP triggers an intelligent service to the VPN service platform.

In S2, the VPN service platform sends a CCR message carrying Initial, i.e., a charging start request message that may be used for authentication reservation, according to Diameter Credit Control (DCC) protocol specifications with the OCS.

In S3, the service association engine intercepts the CCR message carrying Initial sent from the service platform to the OCS, and performs a fuzzy matching with the locally stored service record information according to the service attribute information carried in the CCR message, such as a terminal number of a currently charging subscriber, a calling number, a called number and call start time. The fuzzy matching for example allows an interval between the call start time carried in the CCR message and that in the stored service record information to be not more than 1 s, and the matching result may indicate whether there is any service associated with that service. If a piece of fuzzily matched service record information exists, then a CID is obtained from the fuzzily matched service record information, and if no fuzzily matched service record information exists, then a new and globally unique CID is allocated to the service. In S3, since no associated service occurs, the service association engine allocates a new and globally unique CID to the service.

In S4, the service association engine carries the CID in the CCR message, and sends the CCR message to the OCS.

In S5, the OCS searches in locally stored charging information according to the CID in the CCR message, wherein the locally stored charging information includes a CID and charging data that may include service attribute information. The searching result by the OCS may indicate whether the present service is an initial service of the subscriber or an associated service that is associated with the initial service. If a piece of matched charging information is found, it means that the present service is an associated service that is associated with the initial service; and if no matched charging information is found, it means that the present service is the initial service of the subscriber. In S5, since no associated service occurs, the OCS judges that the present service is the initial service of the subscriber, determines a charging rate for the initial service, and performs charging processing such as charging inverse calculation according to the charging rate.

In S6, when the authentication reservation succeeds, the OCS stores the CID and the charging data carried in the CCR message into the charging information, and returns a Credit Control Answer (CCA) message carrying the CID to the service platform.

In S7, upon receiving the CCA message and analyzing that the result code in the CCA message indicates a successful charging, the service association engine stores the CID and the current service key information carried in the charging start request message into the service record information, removes the CID from the CCA message, and sends the CCA message with the CID removed to the VPN service platform. The service association engine stores service key information such as a SessionID, a terminal number of a currently charging subscriber, a calling number, a called number and call start time, etc.

In S8, the VPN service platform indicates the SSP to make a call connection, and performs subsequent service monitoring flow according to allocation duration information carried in the CCA message.

In S9, the SSP again triggers the intelligent service to the service of multiple terminals with one number platform through a multi-service triggering mechanism.

In S10, the service of multiple terminals with one number platform sends a CCR message carrying Initial, i.e., a charging start request message that may be used for authentication reservation, according to the DCC protocol specifications with the OCS.

In S11, the service association engine intercepts the CCR message sent from the service of multiple terminals with one number platform to the OCS. The service association engine performs a fuzzy matching with the locally stored service record information according to the service attribute information carried in the service key information such as a terminal number of a currently charging subscriber, a calling number, a called number and call start time carried in the CCR message, and the fuzzy matching for example allows an interval between the call start time in the service attribute information and that in the stored service record information to be not more than 1 s. Since the associated service occurs, in S11, the service association engine succeeds in the fuzzy matching, and obtains the CID from the fuzzily matched service record information.

In S12, the service association engine carries the CID obtained through the fuzzy matching in the CCR message and sends the CCR message to the OCS.

In S13, the OCS searches in the locally stored charging information according to the CID carried in the CCR message. The searching result may indicate whether the present service is the initial service of the subscriber or an associated service that is associated with the initial service. If a piece of matched charging information is found, it means that the present service is an associated service that is associated with the initial service; and if no matched charging information is found, it means that the present service is the initial service of the subscriber. Since the initial service occurs in this embodiment, in S13, the OCS judges that the present service is the associated service of the subscriber. The OCS determines a service configuration rule for the associated service, then determines a charging rate according to the service configuration rule, and then performs charging processing such as charging inverse calculation according to the charging rate.

In S14, when the authentication reservation succeeds, the OCS stores the CID carried in the CCR message and the current service key information into the charging information, and returns a CCA message carrying the CID to the service platform.

In S15, upon receiving the CCA message, the service association engine stores the searched CID and the current service key information carried in the CCR message into the service record information, removes the CID from the CCA message, and sends the CCA message with the CID removed to the service of multiple terminals with one number platform. The service association engine stores the service key information such as a SessionID, a terminal number of a currently charging subscriber, a calling number, a called number and call start time, etc.

In S16, the service of multiple terminals with one number platform instructs the SSP to make a call connection, and performs subsequent service monitoring flow according to allocation duration information carried in the CCA message.

Figure 3C:
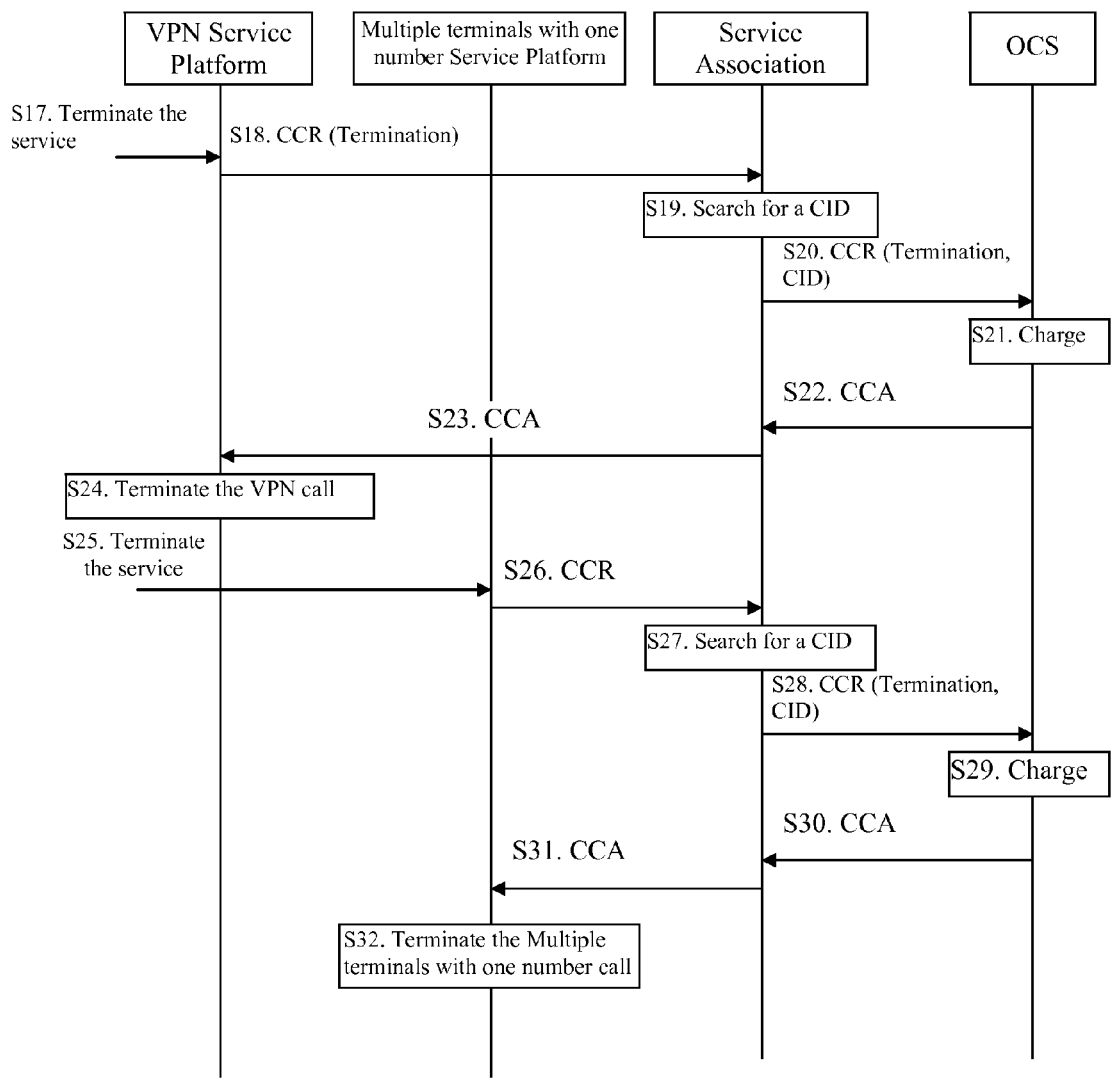
FIG. 3C is a flowchart of a method for associating services during a service termination process according to Embodiment 3 of the present invention.

FIG. 3C illustrates a flow of a method for associating services, in which the subscriber terminates the call, and message exchanges are performed among the service association engine and the service of multiple terminals with one number platform, the VPN service platform and the OCS to implement the service of multiple terminals with one number and the VPN service.

With reference to FIG. 3C, in S17, the SSP sends to the VPN service platform an intelligent signaling that instructs to terminate the service.

In S18, the VPN service platform sends a CCR message carrying Termination, i.e., a charging termination request message, according to the DCC protocol specifications with the OCS.

In S19, the service association engine intercepts the CCR message carrying Termination sent from the VPN service platform to the OCS, searches in the locally stored service record information according to the SessionID carried in the CCR message, and obtains a CID corresponding to the service according to the searching result.

In S20, the service association engine carries the searched CID in the CCR message, and sends the CCR message carrying the CID to the OCS.

In S21, the OCS searches in the locally stored charging information according to the CID carried in the CCR message. If it is found through the searching that there are more than one associated services, the OCS determines a multi-service configuration rule corresponding to the associated services, and performs preferential billing and charging on the present VPN service according to a rate corresponding to the multi-service configuration rule and the charging data for the present VPN service.

In S22, after the billing and charging succeed, the OSC returns a CCA message carrying the CID to the VPN service platform.

In S23, the service association engine intercepts the CCA message, removes the CID from the CCA message, and sends the CCA message with the CID removed to the VPN service platform.

In S24, upon receiving the CCA message, the VPN service platform normally terminates the present VPN call flow.

In S25, the SSP sends to the service of multiple terminals with one number platform an intelligent signaling that instructs to terminate the service.

In S26, the service of multiple terminals with one number platform sends a CCR message carrying Termination, i.e., a charging termination request message, according to the DCC protocol specifications with the OCS.

In S27, the service association engine intercepts the CCR message carrying Termination sent from the service of multiple terminals with one number platform to the OCS, searches in the locally stored service record information according to the SessionID carried in the CCR message, and obtains a CID corresponding to the service according to the searching result.

In S28, the service association engine carries the searched CID in the CCR message, and sends the CCR message carrying the CID to the OCS.

In S29, the OCS searches in the locally stored charging information according to the CID carried in the CCR message. If it is found through the searching that there are more than one associated services, the OCS determines a multi-service configuration rule corresponding to the associated services, and performs preferential billing and charging on the present service of multiple terminals with one number according to a rate corresponding to the multi-service configuration rule and the charging data for the present service of multiple terminals with one number.

In S30, after the billing and charging succeed, the OSC returns a CCA message carrying the CID to the service of multiple terminals with one number platform.

In S31, the service association engine intercepts the CCA message, removes the CID from the CCA message, and sends the CCA message with the CID removed to the service of multiple terminals with one number platform.

In S32, upon receiving the CCA message, the service of multiple terminals with one number platform normally terminates the present multiple terminals with one number call flow.

With respect to Embodiment 3, it shall be noted that the embodiment is described with an example in which the VPN service is triggered firstly, and then the service of multiple terminals with one number. The triggering and termination orders of the two intelligent services may be interchanged, and the triggering and termination orders of the associated services are not limited in this embodiment. In addition, the service association engine may store the service record information for a predetermined period of time and then deletes it, rather than immediately delete the service record information corresponding to a service after the service is terminated.

Embodiment 4 is an apparatus for associating services based on service nesting, which may be provided within or separately from the charging platform. The configuration of the apparatus is illustrated in FIG. 4.

Figure 4:
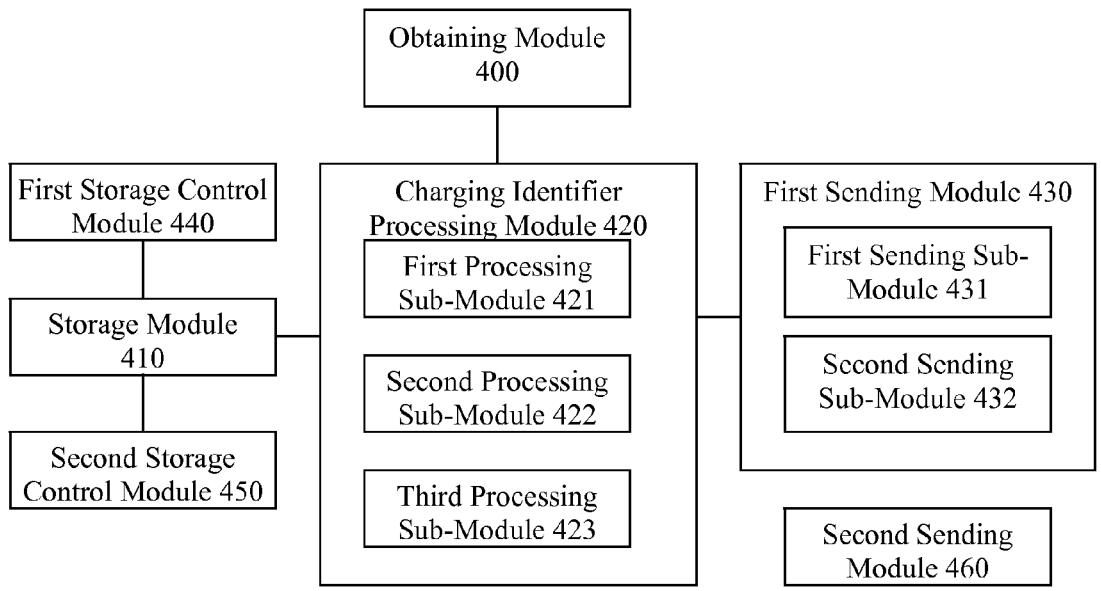
FIG. 4 is a schematic diagram of an apparatus for associating services based on service nesting charging according to Embodiment 4 of the present invention.

The apparatus as shown in FIG. 4 includes an obtaining module 400, a CID processing module 420 and a first sending module 430. Alternatively, the apparatus may further include at least one of a storage module 410, a first storage control module 440, a second storage control module 450 and a second sending module 460.

The obtaining module 400 is configured to obtain from a service platform a request message carrying key service information. The request message obtained by the obtaining module 400 may be a prior art charging request message. It will be appreciated that the request message obtained by the obtaining module 400 may be other message than the charging request message, such as a message carrying the key service information, which is newly added for this embodiment.

In case of an online charging service, a prior art service platform needs to send a charging request message to a charging platform during the implementation of the service. The obtaining module 400 may intercept the charging request message sent from the service platform to the charging platform, i.e., the charging request message sent from the service platform with respect to the online charging service is transferred to the charging platform through the apparatus of this embodiment. The charging request message obtained by the obtaining module 400 may be a charging request message for a prepaid online charging service or a real-time credit-control postpaid online charging service. The service type of the online charging service, the content of the key service information and the specific form of the charging request message, etc. are the same as those described in Embodiment 1, and herein are omitted.

In case of an offline charging session service, the prior art service platform does not need to send any charging request message to the charging platform during the implementation of the service, and only generates a phone bill at the end of the service. This embodiment shall reform the service platform and enable it to send a charging request message, so that the obtaining module 400 can obtain the charging request message sent by the service platform.

The charging request message obtained by the obtaining module 400 may be a CCR message, or a charging request message based on other protocols such as an operator's private protocol. This embodiment does not limit the protocol employed by the charging request message obtained by the obtaining module 400.

The obtaining module 400 may identify the online charging service and the offline charging service according to the information carried in the received charging request message. For example, a field of current prior art charging request message may be extended so that the obtaining module 400 can identify the online charging service and the offline charging service according to the information carried in the field. This embodiment does not limit the implementation for the obtaining module 400 to identify the online charging service and the offline charging service.

The storage module 410 is configured to store service record information. The content of the service record information stored in the storage module 410 is related to service attribute information and/or service identification information. For example, the service record information stored in the storage module 410 may include a terminal number of a currently charging subscriber, a calling number, a called number and call start time, service identification information and a CID, etc. It will be appreciated that, in case of an offline charging call service, the service record information stored in the storage module 410 may not include the service identification information; and in case of an event service, the service record information stored in the storage module 410 may not include the service identification information, and the call start time shall be occurrence time of the specific service. This embodiment does not limit the contents of the service attribute information, the service identification information and the service record information stored in the storage module 410.

The CID processing module 420 is configured to search in the stored service record information (e.g., the service record information stored in the storage module 410) for a piece of service record information which matches the key service information in the request message obtained by the obtaining module 400, obtain a CID in a piece of matched service record information if the matched service record information exists, and allocate a CID if no matched service record information exists.

The CID processing module 420 includes at least one of a first processing sub-module 421, a second processing sub-module 422 and a third processing sub-module 423.

In case of the online charging service, if the charging request message received by the obtaining module 400 is an initial charging request message such as a charging start request message for the service, the first processing sub-module 421 may perform a fuzzy matching with the stored service record information (e.g., the service record information stored by the storage module 410) according to the service attribute information carried in the initial charging request message. If a piece of fuzzily matched service record information exists, the first processing sub-module 421 obtains a CID in the matched service record information, and if no fuzzily matched service record information exists, the first processing sub-module 421 allocates a CID. The first processing sub-module 421 shall ensure that the CID allocated to the present online charging service is globally unique for a predetermined period. The service attribute information is used for describing the service, and the content thereof is the same as that described in Embodiment 1, and herein is omitted.

In case of the online charging service, if the charging request message received by the obtaining module 400 is not an initial charging request message for the service, for example it is a charging intermediate request message or a charging termination request message, the second processing sub-module 422 may obtain a CID by searching in the stored service record information (e.g., the service record information stored by the storage module 410) according to service identification information carried in the charging request message received by the obtaining module 400. The service identification information is used for uniquely identifying a service initiated by the subscriber, and the content thereof is the same as that described in Embodiment 1, and herein is omitted.

In case of an offline charging service, if a charging request message is received by the obtaining module 400, the third processing sub-module 423 may perform a fuzzy matching with the stored service record information according to the service attribute information carried in the charging request message. If a piece of matched service record information exists, the third processing sub-module 423 obtains a CID in the matched service record information, and if no matched service record information exists, the third processing sub-module 423 allocates a CID. Similarly, the third processing sub-module 423 shall ensure that the CID allocated to the present offline charging service is globally unique for a predetermined period. In addition, the content of the service attribute information carried in the charging request message for the offline charging service may be set according to the type of the service that triggers the charging request message.

The first sending module 430 is configured to send the CID and the information carried in the request message to a receiving end of the request message. The CID is used by the charging platform to perform an association charging on multiple services which have the same CID.

The first sending module 430 may include at least one of a first sending sub-module 431 and a second sending sub-module 432.

In case of an online charging service, the first sending sub-module 431 sends to the charging platform a charging request message that carries the CID.

In case of an offline charging service, the second sending sub-module 432 may directly send to the service platform a charging answer message that carries the CID. To be especially pointed out for the offline charging service, the second sending sub-module 432 does not send the charging request message to the charging platform.

The first storage control module 440 is configured to, in case of the online charging service, store the CID allocated or obtained through searching by the CID processing module 420 and the service key information carried in the charging request message into the service record information stored in the storage module 410, after the apparatus as illustrated in FIG. 4 receives a charging answer message (e.g., a CCA message) that indicates a successful charging returned by the charging platform in response to the initial charging request message for the online charging service.

The second storage control module 450 is configured to, in case of the offline charging service, store the CID allocated or obtained through searching by the CID processing module 420 and the service key information carried in the charging request message into the service record information stored in the storage module 410, after the obtaining module 400 receives a charging request message (e.g., a charging start request message) sent by the service platform.

The second sending module 460 is configured to, in case of the online charging service, remove the CID from a charging answer message after the apparatus as illustrated in FIG. 4 receives the charging answer message returned by the charging platform, and sends the charging answer message with the CID removed to the service platform.

In Embodiment 4, the CID processing module 420 matches the key service information carried in the request message with the stored service record information, and obtains a CID from a piece of matched service record information, or allocates a CID when there is no matched service record information, so that the services nested with each other can have the same CID. As a result, the charging platform can determine a plurality of associated services nested with each other, so as to flexibly charge the associated services according to a rate corresponding to the service configuration rule, and thus improve flexibility of a charging mode for the nested services.

Embodiment 5 is a charging platform, which may be an online charging platform (e.g., an OSC, etc.) or an offline charging platform. The configuration of the charging platform is illustrated in FIG. 5.

Figure 5:
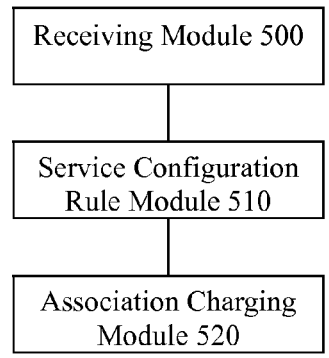
FIG. 5 is a schematic diagram of a charging platform according to Embodiment 5 of the present invention.

The charging platform as shown in FIG. 5 includes a receiving module 500, a service configuration rule module 510 and an association charging module 520.

The receiving module 500 is configured to receive a message sent from a service association apparatus, and store a CID and charging data for a service carried in the message into a charging storage unit.

In case of an online charging platform, the CID and the charging data received by the receiving module 500 may be sent by the executor of Embodiment 1, and the CID and the charging data may be carried in the charging request message, i.e., the receiving module 500 can obtain the CID and the charging data from the received charging request message.

In case of an offline charging platform, the CID and the charging data received by the receiving module 500 may be sent by the service platform, and the CID and the charging data may be carried in a phone bill, i.e., the receiving module 500 obtains the CID and the charging data from the received phone bill.

The service configuration rule module 510 is configured to determine a service configuration rule for a plurality of services having the same CID in the charging storage unit. If a plurality of services have the same CID, it means that they are services associated with each other due to service nesting. The service configuration rule module 510 may select and determine a service configuration rule for the plurality of services having the same CID according to the pre-stored service configuration rule.

The association charging module 520 is configured to perform an association charging on the plurality of services having the same CID according to a rate corresponding to the service configuration rule determined by the service configuration rule module 510 and the charging data received by the receiving module 500. The correspondence between the service configuration rule and the rate may be stored in the association charging module 520, which may determine the rate according to the correspondence. This embodiment does not limit the implementation process in which the association charging module 520 determines the rate and charges based on the rate.

In Embodiment 5, the receiving module 500 may receive a CID and charging data, and the services nested with each other have the same CID. Thus, the service configuration rule module 510 may determine a plurality of associated services nested with each other according to the CID, and determine a service configuration rule for the plurality of associated services, so that the association charging module 520 can flexibly charge the associated services according to a rate corresponding to the service configuration rule, and thus improves flexibility of a charging mode for the nested services.

Embodiment 6 is a system for associating services based on service nesting. The configuration of the system is illustrated in FIG. 6.

Figure 6:
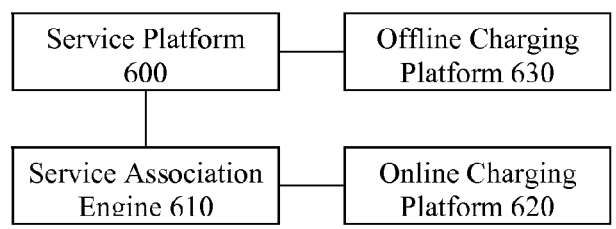
FIG. 6 is a schematic diagram of a system for associating services based on service nesting charging according to Embodiment 6 of the present invention.

The system as shown in FIG. 6 includes a service association engine 610 connected to a service platform 600. Alternatively, the system may further include at least one of an online charging platform 620 and an offline charging platform 630. Although FIG. 6 just illustrates one service platform 600, there may be multiple service platforms 600 connected to the service association engine 610 in an actual network.

The service platform 600 is configured to send a request message carrying key service information.

The request message sent by the service platform 600 may be current prior art charging request message. It will be appreciated that the request message sent by the service platform 600 may be other message than the charging request message, such as a message newly added for this embodiment and carrying the key service information.

In case of an online charging service, the prior art service platform 600 may not be reformed, i.e., the service association engine 610 intercepts the charging request message sent from the service platform 600 to the online charging platform 620. The charging request message sent from the service platform 600 to the online charging platform 620 may be a charging request message for a prepaid online charging service or a real-time credit-control postpaid online charging service. The service type of the online charging service, the content of the key service information and the specific form of the charging request message, etc. are the same as those described in Embodiment 1, and herein are omitted.

In case of an offline charging service, the service platform 600 shall be reformed to send a charging request message, so that the service association engine 610 may receive the charging request message sent by the service platform 600. In addition, the service platform 600 may receive a charging answer message carrying a CID returned by the service association engine 610 in response to the charging request message. When the service platform 600 generates a phone bill for the offline charging service, a CID corresponding to the offline charging service shall be contained in the phone bill.

The charging request message sent by the service platform 600 may be a CCR message, or a charging request message based on other protocols such as an operator's private protocol. This embodiment does not limit the protocol employed by the charging request message sent by the service platform 600.

The service association engine 610 is configured to obtain the request message sent by the service platform 600, and search in the stored service record information for a piece of service record information which matches the key service information in the request message. If a piece of matched service record information exists, the service association engine 610 obtains a CID in the matched service record information, and if no matched service record information exists, the service association engine 610 allocates a CID. The service association engine 610 sends the CID and the information carried in the request message to a receiving end of the request message, wherein the CID is used by the charging platform to perform an association charging on multiple services which have the same CID. The receiving end of the request message may be the online charging platform 620 or the service platform 600. In case of an online charging service, the service association engine 610 sends to the online charging platform 620 a charging request message that carries the CID. In case of an offline charging service, the service association engine 610 may directly send to the service platform 600 a charging answer message that carries the CID. To be especially pointed out for the offline charging service, the service association engine 610 does not send the charging request message to the offline charging platform 630.

The content of the service record information stored in the service association engine 610 is related to service attribute information and/or service identification information. For example, the service record information stored in the service association engine 610 may include a terminal number of a currently charging subscriber, a calling number, a called number, call start time, service identification information and a CID, etc. It will be appreciated that, in case of an offline charging service, the service record information stored in the service association engine 610 may not include the service identification information; and in case of an online charging event service, the service record information stored in the service association engine 610 may not include the service identification information, and the call start time shall be the occurrence time of the specific service. This embodiment does not limit the contents of the service attribute information, the service identification information and the service record information stored in the service association engine 610.

In case of the online charging service, if the charging request message received by the service association engine 610 is an initial charging request message for the service, such as a charging start request message, the service association engine 610 may perform a fuzzy matching with the stored service record information according to the service attribute information carried in the initial charging request message. If a piece of matched service record information exists, the service association engine 610 obtains a CID in the matched service record information, and if no matched service record information exists, the service association engine 610 allocates a CID. The service association engine 610 shall ensure that the CID allocated to the present online charging service is globally unique for a predetermined period. The service attribute information is used for describing services, and the content thereof is the same as that described in Embodiment 1, and herein is omitted.

In case of the online charging service, if the charging request message received by the service association engine 610 is not an initial charging request message for the service, for example it is a charging intermediate request message or a charging termination request message, the service association engine 610 may obtain a CID by searching in the stored service record information according to service identification information carried in the received charging request message. The service identification information is used for uniquely identifying a service initiated by the subscriber, and the content thereof is the same as that described in Embodiment 1, and herein is omitted.

In case of an offline charging service, when receiving a charging request message, the service association engine 610 may perform a fuzzy matching with the stored service record information according to the service attribute information carried in the charging request message. If a piece of matched service record information exists, the service association engine 610 obtains a CID in the matched service record information, and if no matched service record information exists, the service association engine 610 allocates a CID. Similarly, the service association engine 610 shall ensure that the CID allocated to the present offline charging service is globally unique for a predetermined period. In addition, the content of the service attribute information carried in the charging request message for the offline charging service may be set according to the type of the service that triggers the charging request message.

In case of the online charging service, upon receiving a charging answer message (e.g., a CCA message) that indicates a successful charging returned by the online charging platform 620 in response to an initial charging request message for the online charging service, the service association engine 610 stores the CID allocated or obtained through searching for the initial charging request message and the service key information carried in the charging request message into the service record information. In addition, upon receiving the charging answer message returned by the charging platform, the service association engine 610 removes the CID from the charging answer message, and sends the charging answer message with the CID removed to the service platform 600.

In case of the offline charging service, upon receiving a charging request message (e.g., a charging start request message) sent from the service platform 600, the service association engine 610 stores the CID allocated or obtained through searching for the charging request message and the service key information carried in the charging request message into the service record information.

The online charging platform 620 is configured to receive the message sent by the service association engine 610, store the CID and the charging data carried in the message into a charging storage unit, and determine a service configuration rule for a plurality of services having the same CID in the charging storage unit. The online charging platform 620 performs an association charging on the plurality of services having the same CID according to a rate corresponding to the service configuration rule and the received charging data.

The offline charging platform 630 is configured to receive from the service platform 600 a phone bill containing a CID and charging data, determine a service configuration rule for a plurality of phone bills having the same CID, and perform an association charging on the plurality of services having the same CID according to a rate corresponding to the service configuration rule and the received charging data.

The configurations of the service association engine 610, the online charging platform 620 and the offline charging platform 630 are the same as those described in the above embodiments, and herein are omitted.

Based on the descriptions of the above embodiments, a person skilled in the art will appreciate that the present invention can be implemented by a combination of software and an essential hardware platform, and of course only through hardware, but the former is a preferable embodiment under many circumstances. In view of this, parts or all of the technical solutions of the present invention, which make a contribution to the prior art, can be reflected in a form of a software product capable of executing the flows of the above methods. The software product may be stored in a storage medium such as a ROM/RAM, a magnetic disk and an optical disk, and include instructions to enable a computer equipment (e.g., a personal computer, a server, a network facility, etc.) to execute the methods of the embodiments or certain parts thereof in the present invention.

Although the present invention is described with reference to the embodiments, a person skilled in the art will appreciate that many modifications and changes may be made to the present invention without deviating from the spirit of the present invention, and those modifications and changes will fall within the scope defined by the accompanied claims.

What is claimed is:

1. A method for associating services based on service nesting charging, comprising:
   obtaining from a service platform a request message carrying key service information;
   performing a Charging Identifier processing according to the request message to obtain a charging identifier, comprising: searching in stored service record information for a piece of service record information which matches the key service information; and
   obtaining, if a piece of matched service record information exists, a charging identifier in the matched service record information, and allocating a charging identifier if no matched service record information exists, wherein the charging identifier is used by a charging platform to perform an association charging on a plurality of services having the same charging identifier which were simultaneously subscribed by a subscriber; and
   sending the charging identifier and information carried in the request message to a receiving end of the request message.

2. The method according to claim 1, wherein if the method is based on an online charging service, the request message is a charging request message, and the Charging Identifier processing comprises:
   performing a fuzzy matching with the stored service record information according to service attribute information carried in the charging request message if the charging request message is an initial charging request message for the online charging service; and
   obtaining, if a piece of fuzzily matched service record information exists, a charging identifier in the fuzzily matched service record information, and allocating a charging identifier if no fuzzily matched service record information exists.

3. The method according to claim 2, wherein if the method is based on a call service, the service attribute information comprises a terminal number of a currently charging subscriber, a calling number, a called number and call start time, and the fuzzy matching comprises the terminal number of the currently charging subscriber, the calling number and the called number carried in the charging request message are the same as those in the stored service record information, and there is a predetermined time interval between the call start time carried in the charging request message and that in the stored service record information; or
   the service identification information comprises a session identifier.

4. The method according to claim 1, wherein if the method is based on an offline charging service, the request message is a charging request message, and the Charging Identifier processing comprises:
   performing a fuzzy matching with the stored service record information according to service attribute information carried in the charging request message; obtaining, if a piece of fuzzily matched service record information exists, a charging identifier in the fuzzily matched service record information, and allocating a charging identifier if no fuzzily matched service record information exists.

5. The method according to claim 1, wherein if the method is based on an online charging service, the service record information is that stored according to the allocated or obtained charging identifier and the service key information carried in the charging request message, after a charging answer message that indicates a successful charging is received, which is returned by the charging platform in response to an initial charging request message for the online charging service; or
   if the method is based on an offline charging service, the service record information is that stored according to the allocated or obtained charging identifier and the service key information carried in the charging request message, after a charging request message sent by the service platform is received.

6. The method according to claim 1, wherein the sending the charging identifier and the information carried in the request message to the receiving end of the request message comprises:
   sending a charging request message carrying a charging identifier to the charging platform if the method is based on an online charging service; or
   sending a charging answer message carrying a charging identifier to the service platform if the method is based on an offline charging service.

7. The method according to claim 1, wherein if the method is based on an online charging service, the method further comprises:
   upon receiving a charging answer message returned by the charging platform, removing the charging identifier from the charging answer message, and sending the charging answer message with the charging identifier removed to the service platform.

8. An apparatus for associating services based on service nesting charging, comprising:
   an obtaining module configured to obtain from a service platform a request message carrying key service information;
   a Charging Identifier processing module configured to search in stored service record information for a piece of service record information which matches the key service information, obtain, if a piece of matched service record information exists, a charging identifier in the matched service record information, and allocate a charging identifier if no matched service record information exists, wherein the charging identifier is used by a charging platform to perform an association charging on a plurality of services having the same charging identifier which were simultaneously subscribed by a subscriber; and
   a first sending module configured to send the charging identifier and information carried in the request message to a receiving end of the request message.

9. The apparatus according to claim 8, wherein the request message is a charging request message, and the Charging Identifier processing module comprises:
   a first processing sub-module configured to, for an online charging service, perform a fuzzy matching with the stored service record information according to service attribute information carried in the charging request message when the charging request message is an initial charging request message for the online charging service, obtain, if a piece of fuzzily matched service record information exists, a charging identifier in the fuzzily matched service record information, and allocate a charging identifier if no fuzzily matched service record information exists.

10. The apparatus according to claim 8, wherein the request message is a charging request message, and the Charging Identifier processing module comprises:
   a third processing sub-module configured to, for an offline charging service, perform a fuzzy matching with the stored service record information according to service attribute information carried in the charging request message, obtain, if a piece of fuzzily matched service record information exists, a charging identifier in the fuzzily matched service record information, and allocates a charging identifier if no fuzzily matched service record information exists.

11. The apparatus according to claim 8, further comprising:
a first storage control module configured to, for an online charging service, store the allocated or obtained charging identifier and service key information carried in the charging request message into the service record information, after the apparatus receives a charging answer message that indicates a successful charging, which is returned by the charging platform in response to an initial charging request message for the online charging service; and/or
a second storage control module configured to, for an offline charging service, store the allocated or obtained charging identifier and service key information carried in the charging request message into the service record information, after the apparatus receives the charging request message sent by the service platform.

12. The apparatus according to claim 8, wherein the first sending module comprises:
a first sending sub-module configured to, for an online charging service, send to the charging platform a charging request message that carries a charging identifier; and
a second sending sub-module configured to, for an offline charging service, send to the service platform a charging answer message that carries a charging identifier.

13. The apparatus according to claim 8, further comprising:
a second sending module configured to, for an online charging service, remove a charging identifier from a charging answer message returned by the charging platform after the apparatus receives the charging answer message, and send the charging answer message with the charging identifier removed to the service platform.

14. A system for associating services based on service nesting charging, comprising a service association engine connected to a service platform;
wherein the service platform is configured to send a request message carrying key service information; and
wherein the service association engine is configured to obtain the request message sent by the service platform, search in stored service record information for a piece of service record information which matches the key service information, obtain, if a piece of matched service record information exists, a charging identifier in the matched service record information, or allocate a charging identifier if no matched service record information exists, and send the charging identifier and information carried in the request message to a receiving end of the request message, wherein the charging identifier is used by a charging platform to perform an association charging on a plurality of services having the same charging identifier which were simultaneously subscribed by a subscriber.

15. The system according to claim 14, further comprising:
an online charging platform configured to receive the message sent by the service association engine, store the charging identifier and the charging data carried in the message into a charging storage unit, determine a service configuration rule for a plurality of services having the same charging identifier in the charging storage unit, and perform an association charging on the plurality of services having the same charging identifier according to a rate corresponding to the service configuration rule and the charging data; and/or
an offline charging platform configured to receive from the service platform a phone bill containing a charging identifier and charging data, determine a service configuration rule for a plurality of phone bills having the same charging identifier, and perform an association charging on the plurality of services having the same charging identifier according to a rate corresponding to the service configuration rule and the charging data, wherein the phone bills are generated by the service platform.

* * * * *